United States Patent
Andrae (10) Patent No.: US 9,567,796 B2
(45) Date of Patent: Feb. 14, 2017

(54) SWING DOOR HAVING AN IMPACT PROTECTION DEVICE

(71) Applicant: Peter Andrae, Vaterstetten (DE)

(72) Inventor: Peter Andrae, Vaterstetten (DE)

(*) Notice: Subject to any disclaimer, the term of this patent is extended or adjusted under 35 U.S.C. 154(b) by 0 days.

(21) Appl. No.: 15/049,964

(22) Filed: Feb. 22, 2016

(65) Prior Publication Data

US 2016/0168903 A1   Jun. 16, 2016

Related U.S. Application Data (63) Continuation of application No. PCT/EP2014/067616, filed on Aug. 19, 2014.

(30) Foreign Application Priority Data

Aug. 20, 2013   (EP) .................................... 13180998

(51) Int. Cl.
| | |
|---|---|
| *E06B 7/28* | (2006.01) |
| *B60R 13/04* | (2006.01) |
| *E06B 3/88* | (2006.01) |
| *E05F 5/06* | (2006.01) |

(52) U.S. Cl.
CPC ............... *E06B 7/28* (2013.01); *B60R 13/04* (2013.01); *B60R 13/043* (2013.01); *E05F 5/06* (2013.01); *E06B 3/88* (2013.01)

(58) Field of Classification Search
CPC ....................................................... E06B 7/28
See application file for complete search history.

(56) References Cited

U.S. PATENT DOCUMENTS

| | | | | |
|---|---|---|---|---|
| 2,678,232 A | * | 5/1954 | Barry | ................... B60R 13/043 293/1 |
| 3,380,193 A | * | 4/1968 | Hill | ....................... B60R 13/043 293/1 |
| 3,513,595 A | * | 5/1970 | Mills | ..................... B60R 13/043 49/462 |

(Continued)

FOREIGN PATENT DOCUMENTS

| | | | |
|---|---|---|---|
| DE | 4439460 C1 * | 12/1995 | ........... B60R 13/043 |
| DE | 200 19 998 U1 | 3/2001 | |

(Continued)

OTHER PUBLICATIONS

Rod—the definition of rod by The Free Dictionary.*

(Continued)

*Primary Examiner* — Katherine Mitchell
*Assistant Examiner* — Marcus Menezes
(74) *Attorney, Agent, or Firm* — Ewers & Hasselmann PLLC (57) ABSTRACT

A swing door is provided that includes a frame, a door leaf with a door leaf edge, and an impact protection device. The impact protection device has a push rod, a lever, and first and second biasing arrangements. The impact protection device is mounted on an end face of the door leaf and is configured to pivot in an opening direction of the swing door and in a direction opposite to the opening direction. The lever is arranged in a gap between the front side and the frame as the swing door is closed. The lever has an outer lever arm protruding from the front side to protect the door leaf edge from an impact as said swing door is opened.

10 Claims, 9 Drawing Sheets

(56) References Cited

U.S. PATENT DOCUMENTS

| | | | |
|---|---|---|---|
| 4,221,411 A * | 9/1980 | Kawada | B60R 13/043 |
| | | | 293/118 |
| 4,839,991 A * | 6/1989 | Rathgeb | B60R 13/043 |
| | | | 49/462 |
| 5,213,389 A * | 5/1993 | Loftis | B60J 3/0213 |
| | | | 248/282.1 |
| 7,086,200 B2 * | 8/2006 | Rathgeb | B60R 13/043 |
| | | | 49/462 |
| 7,360,339 B1 * | 4/2008 | Jooste | B60R 13/043 |
| | | | 296/152 |
| 2008/0172945 A1 * | 7/2008 | Hoffman | E05B 17/0037 |
| | | | 49/386 |

FOREIGN PATENT DOCUMENTS

| | | | | |
|---|---|---|---|---|
| DE | 10 2006 056 396 A1 | 6/2008 | | |
| FR | 2 802 570 A1 | 6/2001 | | |
| FR | 2802570 A1 * | 6/2001 | | B60R 13/043 |

OTHER PUBLICATIONS

Carriage—the definition of carriage by The Free Dictionary.*
International Search Report dated Oct. 15, 2014 of international application PCT/EP2014/067616 on which this application is based.

* cited by examiner

SWING DOOR HAVING AN IMPACT PROTECTION DEVICE

CROSS REFERENCE TO RELATED APPLICATIONS

This application is a continuation application of international patent application PCT/EP2014/067616, filed Aug. 19, 2014, designating the United States and claiming priority from European application 13180998.0, filed Aug. 20, 2013, and the entire content of both applications is incorporated herein by reference.

FIELD OF THE INVENTION

The invention relates to a swing door with a door leaf and an impact protection device which provides an impact protection for a door leaf edge when the swing door is opened.

BACKGROUND OF THE INVENTION

A swing door has a door leaf and a frame, wherein the door leaf is pivotably coupled to the frame via door hinges. When the door leaf is in a closed position, the door leaf is arranged within the frame, wherein play in the form of a gap is provided between the door leaf and the frame. The swing door has an opening direction in which the door leaf can be pivoted via the hinges such that the swing door opens on the door leaf end face facing away from the hinges. As a result, the door leaf projects with the door leaf end face thereof away from the frame into the space, wherein the door leaf can be pivoted only until it strikes, generally with the door leaf edge thereof, against an obstacle.

A problem arises in particular in the case of a motor vehicle door, for example of a passenger vehicle, when the vehicle is parked in confined space conditions, such as, for example, in a garage. There is the risk here, when the motor vehicle door is opened, of the motor vehicle door inadvertently hitting with the door leaf edge thereof against a garage wall, as a result of which paint damage or even dents to the motor vehicle door may be the consequence. Furthermore, there is the risk, when two motor vehicles are parked next to each other, for example in a public car park, of, when the door of the one motor vehicle is opened in an uncontrolled manner, the door being knocked against the other motor vehicle, as a result of which the other motor vehicle may likewise be damaged.

In order at least to mitigate the consequences of the motor vehicle door striking against the garage wall, it is known to attach a padding in the form, for example, of a felt lining to the garage wall. However, the felt lining only has a protective effect if the motor vehicle is parked with respect to the felt lining in such a manner that the motor vehicle door strikes against the felt lining during opening. If, by contrast, the motor vehicle door strikes against the garage wall next to the felt lining, damage to the motor vehicle door can again be anticipated if the motor vehicle door is correspondingly energetically opened.

In addition, it is known to line the motor vehicle door with a rubber lip on the door leaf edge thereof, and therefore, when the motor vehicle door strikes against the garage wall, the door leaf edge is supported by the rubber lip. The rubber lip is visible from outside the motor vehicle even when the motor vehicle door is closed and may interfere with the appearance of the motor vehicle.

SUMMARY OF THE INVENTION

An object of the invention is to provide a swing door with a door leaf and an impact protection device, wherein the impact protection device virtually does not make an appearance when the swing door is closed and, nevertheless, effective impact protection for the door leaf can be achieved with the impact protection device.

The swing door according to an aspect of the invention has a door leaf, a frame, an impact protection device, which is mounted on the end face of the door leaf facing away from the hinges of the swing door, a push rod, and a lever which is coupled so as to be pivotable in and opposite to the opening direction of the door leaf and, in the pivoted-in position thereof, when the door leaf is closed, is arranged in a gap between the end face and the frame, and, as soon as the lever is clear of the frame when the swing door is opened. The lever protrudes in the pivoted-out position thereof by the one lever arm thereof from the end face such that impact protection of the door leaf edge is brought about by the lever when the swing door is opened, wherein the other lever arm is coupled to the one longitudinal end of the push rod and the other longitudinal end of the lever arm is coupled to a driver attached to the frame, and therefore, when the swing door is opened, the lever is driven by the driver via the push rod from the pivoted-in position into the pivoted-out position, and, when the swing door is closed, the lever is driven by the driver via the push rod from the pivoted-out position into the pivoted-in position.

The swing door may be implemented as, but is not limited to, a gull-wing door, a "Lambo style" door or a wing door.

Owing to the fact that the impact protection device is arranged in the gap between the end face of the door leaf and the frame when the door leaf is closed, the impact protection device only makes an appearance externally when the door leaf is opened. In contrast thereto, the impact protection device does not make an appearance externally when the door leaf is closed, and therefore the impact protection device cannot have an adverse effect, for example, on the configuration of the swing door. This is achieved by the fact that the lever can be brought from the pivoted-in position thereof into the pivoted-out position thereof when the door leaf is opened and vice-versa when the door leaf is closed, wherein the lever, in the pivoted-in position thereof, is arranged concealed in the gap and, in the pivoted-out position thereof, protrudes from the door leaf in order to bring about the impact protection for the swing door.

The lever is driven from the pivoted-in position into the pivoted-out position and vice-versa by the driver via the push rod, wherein the driver is attached to the frame. As a result, the work which is to be transmitted to the door leaf in order to open and close the door leaf is used in order to actuate the lever, namely to bring the lever from the pivoted-in position into the pivoted-out position and vice-versa.

When the swing door is opened and closed, the door leaf is moved relative to the frame and therefore also to the drive carriage, wherein the lever is supported on the drive carriage via the push rod.

The push rod and the drive carriage are coordinated with each other with respect to the geometrical configuration and the positions thereof in such a manner that, as soon as the lever is clear of the frame when the swing door is opened, the lever is brought into the pivoted-out position thereof. In an analogous manner, the lever is brought into the pivoted-in position thereof as soon as the lever is no longer clear of the frame when the swing door is closed. As a result, the lever is actuated by the drive carriage via the push rod depending on the position of the door leaf relative to the frame, and therefore the impact protection device is brought into an active state by the lever being pivoted out when the door leaf is opened and into a passive state when the door leaf is closed. In the passive state, the impact protection device does not make an appearance from the outside.

According to an aspect of the invention, the impact protection device has a first biasing arrangement which is supported on the door leaf and acts on the lever such that, as soon as the lever is clear of the frame and the lever is decoupled from the drive carriage, the lever is held in the pivoted-out position by the first biasing arrangement. The lever is therefore pretensioned in the pivoted-out position by the biasing arrangement, and therefore, when the door leaf strikes with the lever, for example, against a wall, the door leaf is cushioned by the biasing arrangement. The occurrence of such severe impacts that may damage the impact protection device and/or the door leaf, for example when the door leaf strikes against the wall, is advantageously prevented as a result. In addition, it is advantageously achieved by the first biasing arrangement that the lever is securely held in the pivoted-out position although the lever is decoupled from the drive carriage. The first biasing arrangement is preferably designed as a helical spring or a torsion spring.

In addition, according to another aspect of the invention, the impact protection device has a second biasing arrangement which is supported on the frame and acts on the drive carriage, wherein that resulting bias force for pivoting the lever that acts on the lever by the second biasing arrangement is larger than that resulting bias force for pivoting the lever that acts on the lever by the first biasing arrangement, and therefore, as long as the lever is not clear of the frame, the lever is driven by the second biasing arrangement via the drive carriage and the push rod into the pivoted-in position. According to yet another aspect of the invention, the second biasing arrangement is designed as a helical spring.

According to an aspect of the invention, the first biasing arrangement acts on the push rod and the second biasing arrangement acts on the push rod via the drive carriage. The lever is therefore actuated via the push rod, wherein the first biasing arrangement and the second biasing arrangement act with the bias forces thereof on the push rod. The first biasing arrangement and the second biasing arrangement interact here with each other in such a manner that, when the drive carriage bears against the push rod, the second biasing arrangement pushes arrangement pushes the first biasing arrangement back and the lever is ultimately held in the pivoted-in position by the second biasing arrangement. As soon as the push rod is decoupled from the drive carriage, the second biasing arrangement no longer acts on the push rod, and therefore only the first biasing arrangement acts on the push rod and the lever is hence held in the pivoted-out position by the first biasing arrangement.

According to another aspect of the invention, the drive carriage is designed as an entrainer which can be displaced longitudinally on the frame, with the bias force of the second biasing arrangement being overcome. It bears against the longitudinal end, which is assigned thereto, of the push rod as long as the lever is not clear of the frame, and is arranged at a distance from the longitudinal end, which is assigned thereto, of the push rod as soon as the lever is clear of the frame. The door leaf preferably has a driver stop which is arranged in such a manner that, as soon as the lever is clear of the frame, the drive carriage bears against the driver stop. The effect therefore achieved with the driver stop is that, when the door leaf is opened, the lever is clear of the frame and the drive carriage bears against the driver stop, the second biasing arrangement is decoupled from the push rod and, as a result, only the first biasing arrangement acts on the push rod.

The drive carriage is arranged on the frame and is displaceable with respect thereto until the drive carriage bears against the driver stop. Furthermore, when the swing door is closed, the drive carriage is displaced relative to the frame by the push rod counter to the bias force of the second biasing arrangement when the lever is not clear of the frame. As soon as the lever is clear of the frame, the drive carriage bears against the driver stop and, when the swing door is opened, the push rod is moved away from the drive carriage.

Alternatively, the drive carriage is designed as a spindle which can be recessed into the frame, with the bias force of the second biasing arrangement being overcome and bears against the longitudinal end, which is assigned thereto, of the push rod as long as the lever is not clear of the frame, and which is arranged at a distance from the longitudinal end, which is assigned thereto, of the push rod as soon as the lever is clear of the frame. Furthermore, according to another aspect of the invention, the drive carriage is designed as a pivot pin which can be pivoted on the frame, with the bias force of the second biasing arrangement being overcome and bears against the longitudinal end, which is assigned thereto, of the push rod as long as the lever is not clear of the frame, and which is arranged at a distance from the longitudinal end, which is assigned thereto, of the push rod as soon as the lever is clear of the frame. In addition, according to another aspect of the invention, the drive carriage is configured as a compression block which is compressed on the frame, with the bias force of the second biasing arrangement being overcome. It bears against the longitudinal end, which is assigned thereto, of the push rod as long as the lever is not clear of the frame, and is arranged at a distance from the longitudinal end, which is assigned thereto, of the push rod as soon as the lever is clear of the frame.

In addition, the one lever arm protrudes from the end face of the door leaf in the pivoted-out position of the lever such that the impact protection of the door leaf edge is brought about with the lever arm when the swing door is opened, and has a pad which, when the swing door is open, is arranged facing away from the frame. With the pad, when the door leaf strikes against a wall, the resulting knock is weakened, and therefore the risk of damage to the wall and to the impact protection device or the door leaf is reduced.

Furthermore, for an installation cavity to be provided in the end face of the door leaf, in which the impact protection device is installed, and therefore, when the lever is in the pivoted-in position thereof, the impact protection device is virtually arranged within the construction space. Only the longitudinal end of the push rod that interacts with the drive carriage protrudes out of the installation cavity. When the swing door is closed, the longitudinal end bridges the gap because the longitudinal end protrudes from the end face of the door leaf and bears against the drive carriage.

The swing door is preferably the door of a motor vehicle. The door of the motor vehicle is particularly advantageously protected by the impact protection device since the impact protection by the impact protection device is desirable in particular in the event of confined parking conditions of the motor vehicle. In addition, the door of the motor vehicle is generally produced from painted sheet metal, and, without the impact protection device, there is the risk of paint chipping off and of the sheet metal becoming bent.

BRIEF DESCRIPTION OF THE DRAWINGS

Example embodiments of the invention will now be described with reference to the drawings wherein.

DESCRIPTION OF EXAMPLE EMBODIMENTS OF THE INVENTION

FIGS. 1 to 8 show a swing door 1 with a door leaf 2. The door leaf 2 is provided with door hinges 3, and therefore the door leaf 2 can be pivoted about the hinges 3 in an opening direction 4. A door leaf edge 6 is arranged on the door leaf end face 5 facing away from the hinges 3, which door leaf edge is exposed to the risk of being struck when the swing door 1 is opened. Furthermore, the swing door 1 has a frame 7, into which the door leaf 2 is installed with the hinges 3 thereof. When the swing door 1 is closed, the door leaf 2 is arranged within the frame 7 in such a manner that just one gap 8 is formed between the frame 7 and the door leaf 2. When the swing door 1 is opened, the door leaf 2 is pivoted about the hinges 3 in the opening direction 4, and therefore the door leaf edge 6 is moved away from the frame 7.

The swing door 1 furthermore has an impact protection device 9 which is arranged on the door leaf end face 5. The impact protection device has a lever 10 which is mounted on the door leaf 2 so as to be pivotable about a bearing 11, and therefore an inner lever arm 12 with a longitudinal end 13 and an outer lever arm 14 with a longitudinal end 15 are formed on the lever 10. The inner lever arm 12 and the outer lever arm 14 are arranged at an angle to each other which is less than 180°. Owing to the fact that the lever is mounted so as to pivotable about the bearing 11, the lever 10 can be brought into a pivoted-in position and into a pivoted-out position. In the pivoted-in position, the inner lever 12 is arranged substantially perpendicularly to the door leaf end face 5, whereas the outer lever arm 14 is arranged substantially parallel to the door leaf end face 5. In the pivoted-out position of the lever arm 10, the inner lever arm 12 is arranged substantially parallel to the door leaf end face 5 and the outer lever arm 14 is arranged substantially perpendicularly to the door leaf end face 5.

Furthermore, the impact protection device 9 has a push rod 17 which has an inner longitudinal end 18 which is coupled by a joint 19 to the longitudinal end 13 of the inner lever arm 12. If the lever 10 is in a pivoted-in position, the push rod 17 extends substantially parallel to the lever 10. A lever stop 16 is provided on the outer lever arm 14, which lever stop bears against the push rod 17 when the lever 10 is in the pivoted-in position, as a result of which the relative position of the push rod 17 with respect to the lever 10 is defined.

The push rod 17 has an outer longitudinal end 20 facing away from the inner longitudinal end 18 of the push rod 17. The impact protection device 9 furthermore has an entrainer or drive carriage 21 which is displaceably mounted on the frame.

A compression spring 22 as a biasing arrangement is supported on the frame 7 and on the drive carriage 21, and therefore the compression spring 22 pretensions the drive carriage 21 in the opening direction 4. A driver stop 23 on which the drive carriage 21 can be positioned, with the compression spring 22 being pretensioned, is provided in the frame 7.

If the lever 10 is in the pivoted-in position thereof, the lever 10 is arranged within the gap 8 when the swing door 1 is closed. The push rod 17 is arranged between the lever 10 and the frame 7, wherein the outer longitudinal end 20 of the push rod 17 bears against the drive carriage 21. The push rod 17 is therefore pretensioned by the compression spring 22 via the drive carriage 21. As a result of the fact that the push rod 17 is coupled at the joint 19 to the inner lever arm 12, a torque acts on the lever 10 about the bearing 11 with a direction of rotation such that the outer lever arm 14 is pressed in the direction of the push rod 17 and bears against the push rod 17 with the lever stop 16 in the pivoted-in position.

In addition, the impact protection device 9 has a tension spring 24 as a biasing arrangement, the tension spring acting on a tension spring anchor 25, which is fastened to the door leaf 2, and on the push rod 17. The tension spring 24 acts on the push rod 17 counter to the compression spring 22 when the lever 10 pivots about the bearing 11. Bias forces produced by the compression spring 22 and the tension spring 24 therefore act on the push rod 17 and, with the interaction of the joint 19 and the inner lever arm 12, result in pivoting of the outer lever arm 14. The bias forces of the compression spring 22 and of the tension spring 24, which bias forces result for the pivoting of the lever 10 about the bearing 11, are such that the resulting bias force of the compression spring 22 is greater than the resulting bias force of the tension spring 24.

When the push rod 17 is displaced, the latter is guided longitudinally in a push rod longitudinal guide 26 of the impact protection device 9, wherein the outer longitudinal end 20 of the push rod 17 carries out a translational movement and the inner longitudinal end 18 of the push rod 17 carries out a rotational movement.

Figure 1:
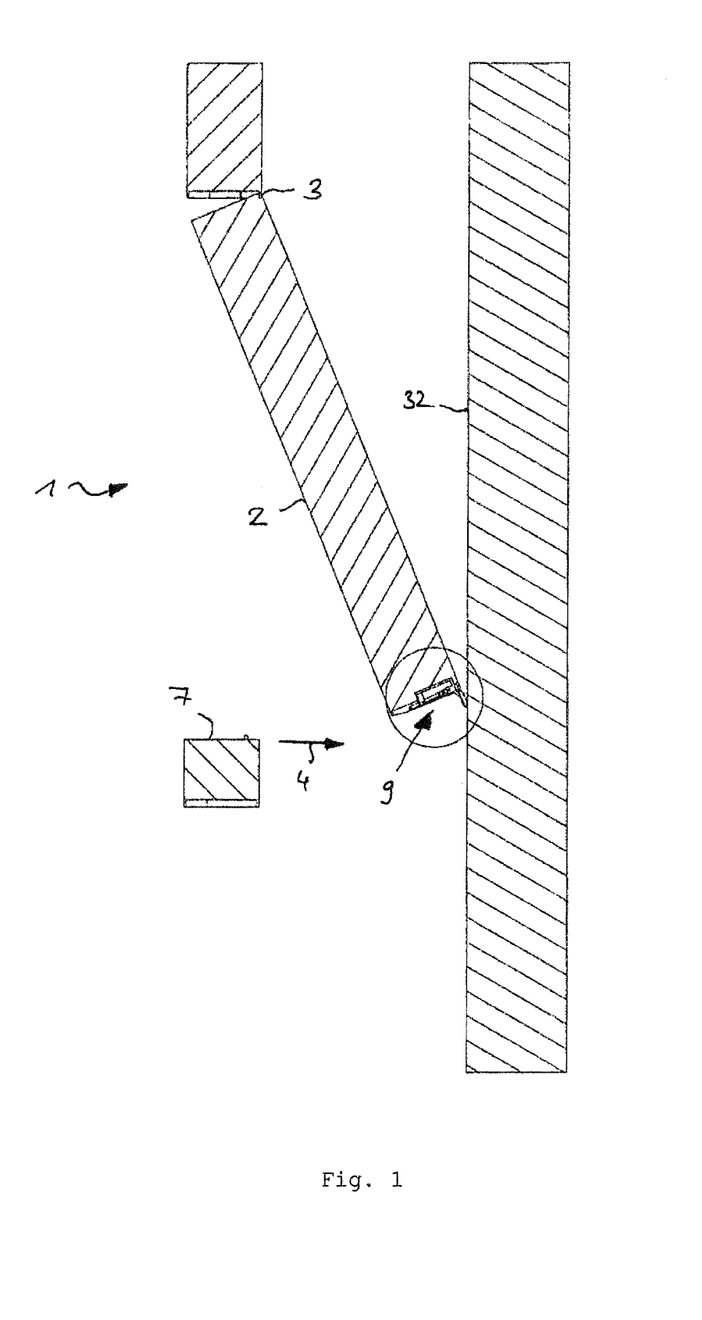
FIG. 1 shows a cross sectional illustration of the preferred embodiment of the swing door according to the invention with the impact protection device according to an example embodiment.
Figure 2:
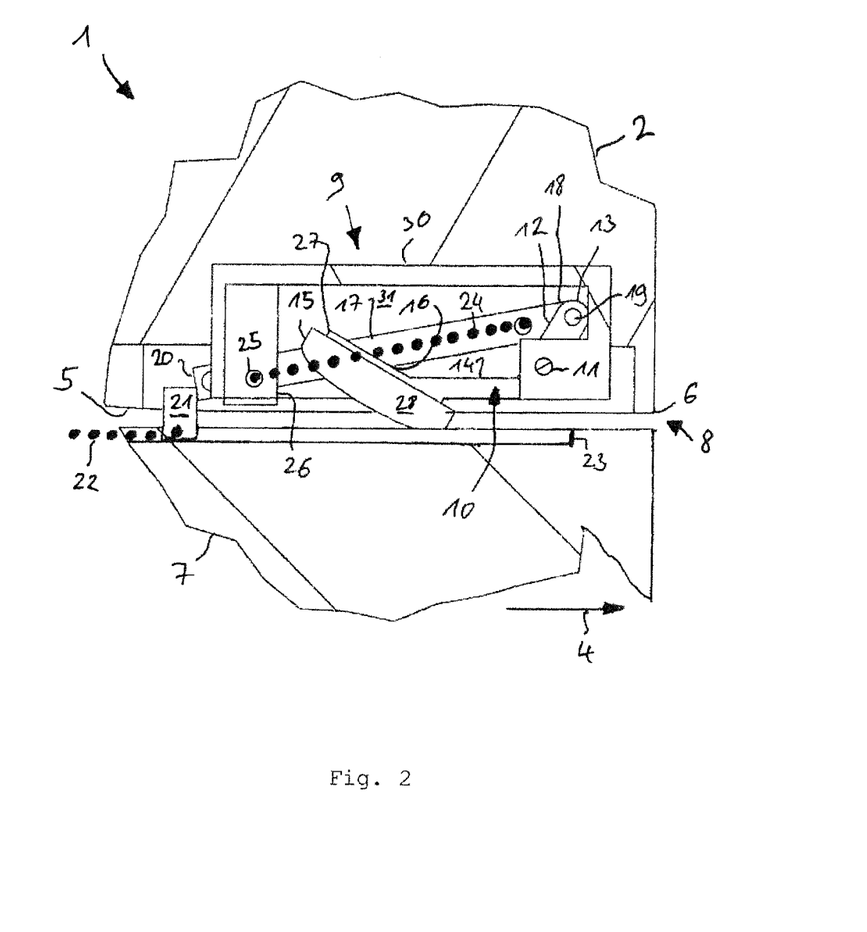
FIG. 2 shows a lever in a pivoted-in position according to an example embodiment.
Figure 3:
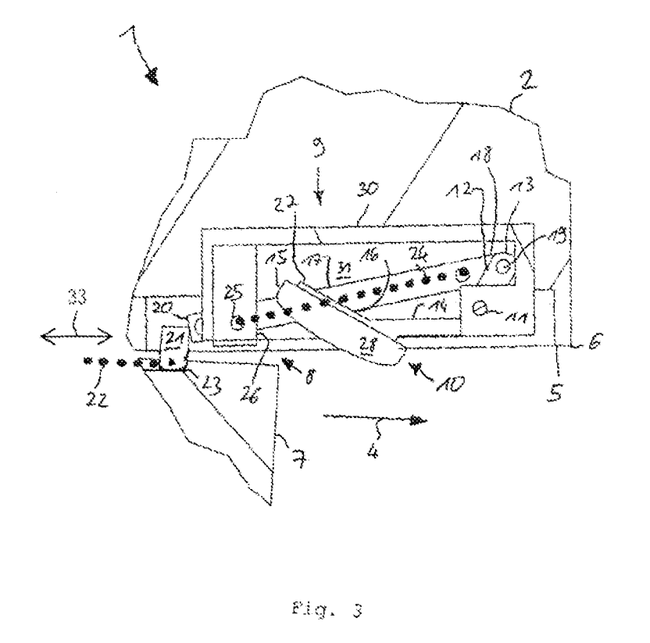
FIG. 3 shows a lever in an intermediate position according to an example embodiment.
Figure 4:
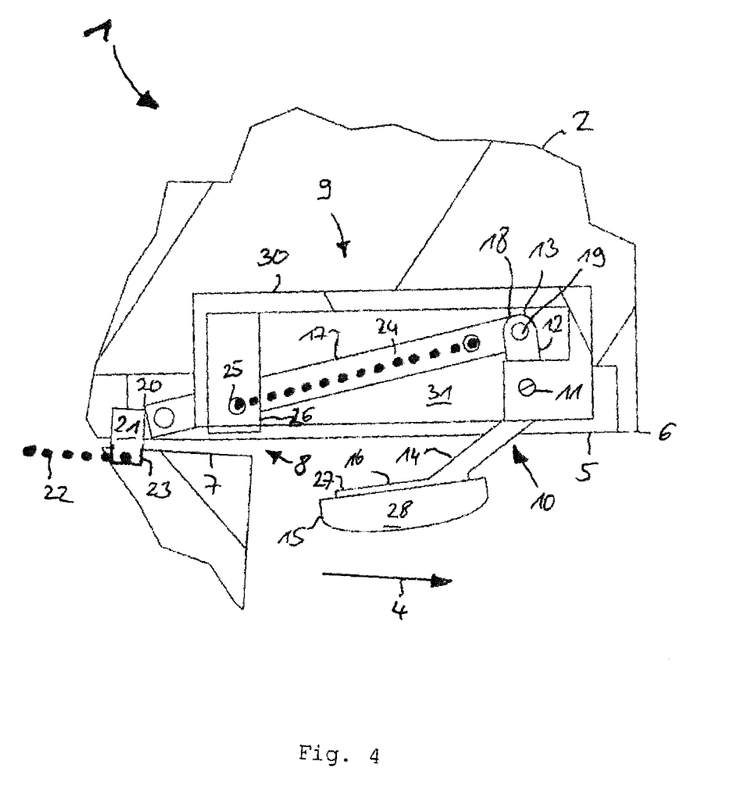
FIG. 4 shows a lever in another intermediate position according to an example embodiment.
Figure 5:
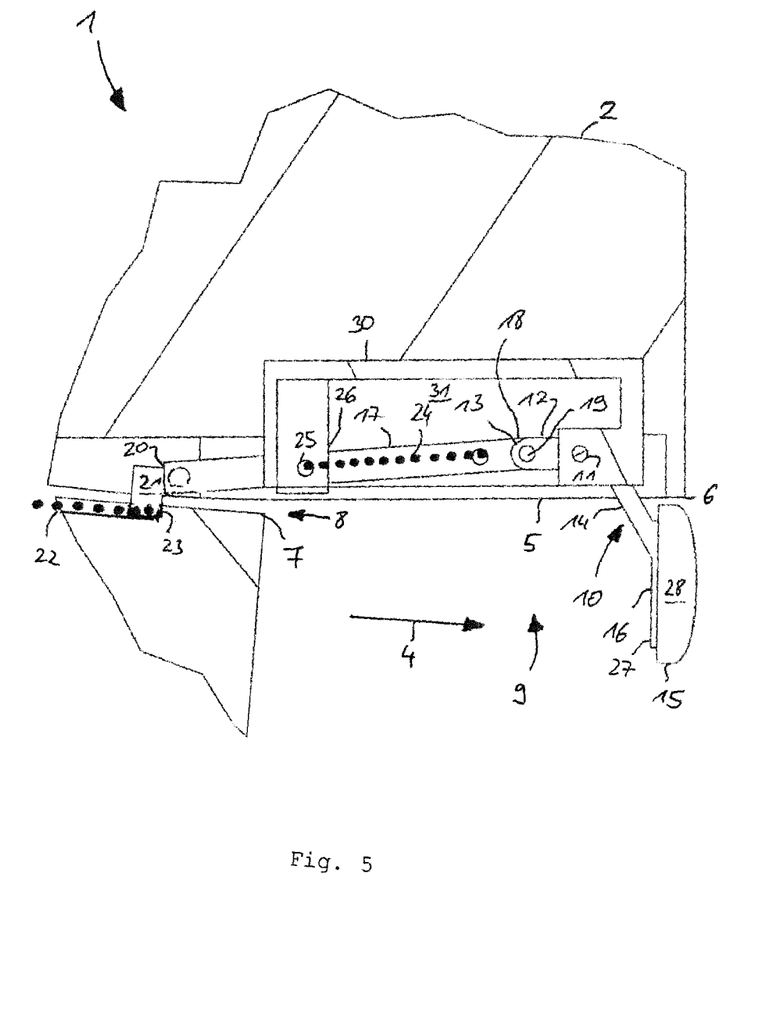
FIG. 5 shows a lever in a pivoted-out position according to an example embodiment.
Figure 6:
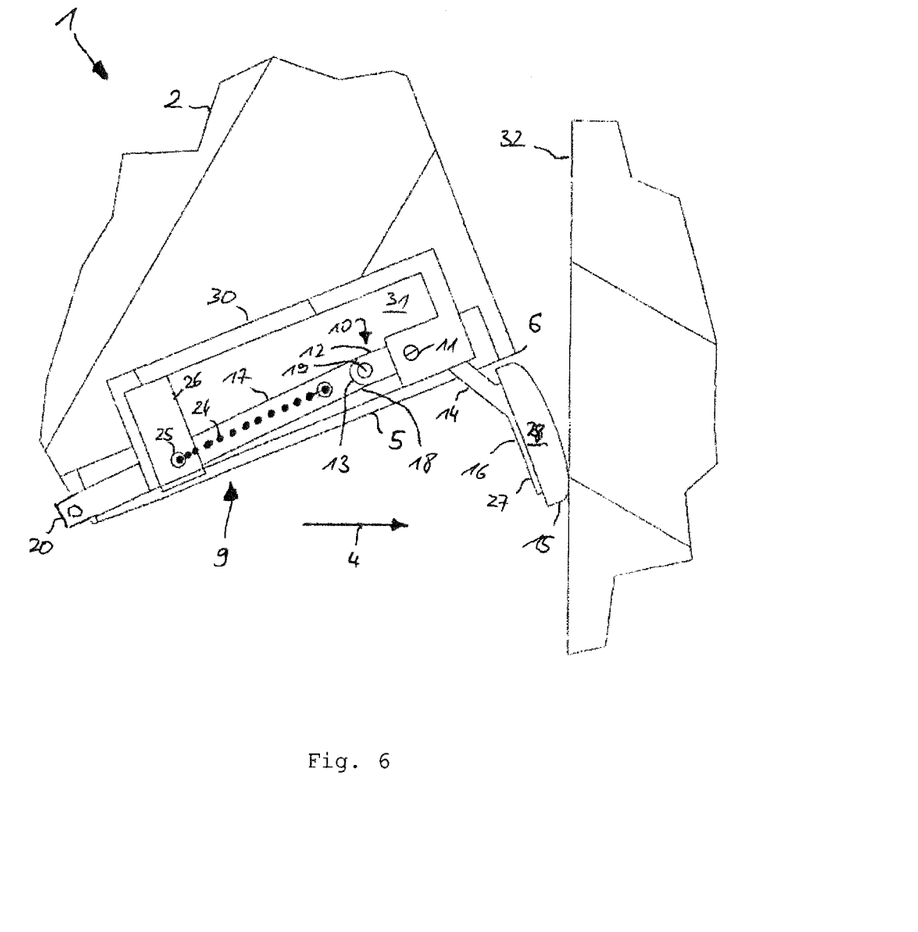
FIG. 6 shows a lever in another pivoted-out position according to an example embodiment.
Figure 7:
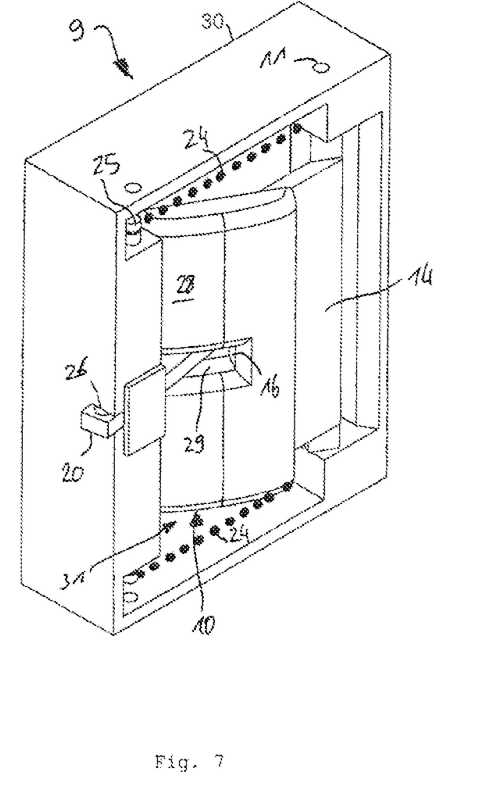
FIG. 7 is a three-dimensional view of an impact protection device with the lever being in a pivoted-in position according to an example embodiment.
Figure 8:
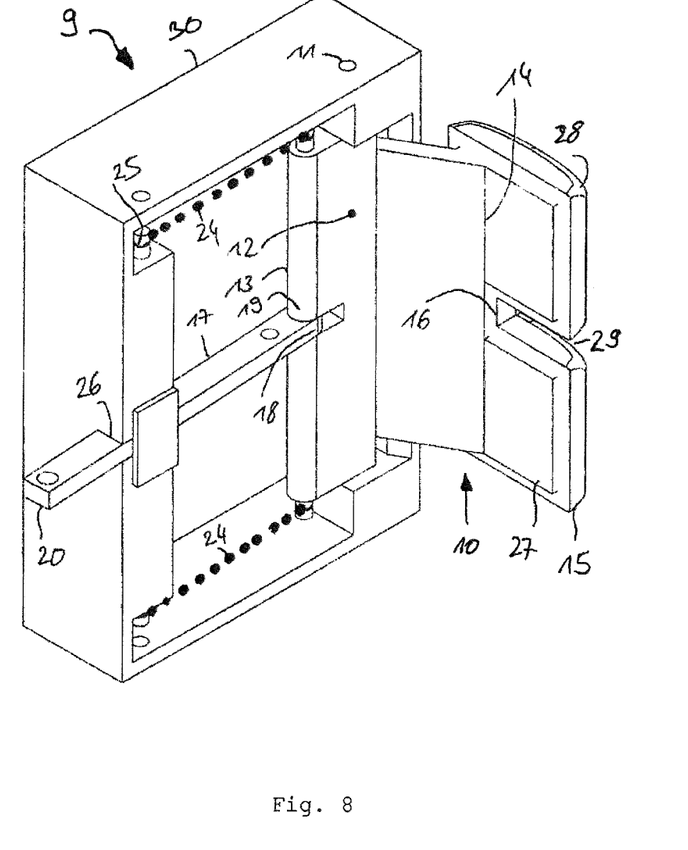
FIG. 8 is a three-dimensional view of an impact protection device with the lever being in a pivoted-out position according to an example embodiment.

A driver stop 23 with which the longitudinal displaceability of the drive carriage 21 indicated by arrow 33 shown in FIG. 3 is limited is provided in the frame 7. The driver stop 23 is arranged in the frame 7 in such a manner that, when the drive carriage 21 bears against the outer longitudinal end 20 of the push rod 17, the drive carriage 21 is pushed in the opening direction 4, when the swing door 1 is opened, until the swing door 1 is opened to such an extent that the lever 10 is clear of the frame 7. At this degree of opening of the swing door 1, the drive carriage 21 bears against the driver stop 23, and therefore, when the swing door 1 is opened further, the drive carriage 21 is decoupled from the outer longitudinal end 20 of the push rod 17. When the swing door 1 is closed, the outer longitudinal end 20 of the push rod 17 is decoupled from the drive carriage 21, as long as the lever 10 is clear of the frame 7. In that position in which the lever 10 is specifically no longer clear of the frame 7, the outer longitudinal end 20 of the push rod 17 bears against the drive carriage 21.

The outer lever arm 14 has a pad plate 27 on which a pad 28 is attached. Furthermore, the pad plate 27 and the pad 28 are provided with a slot 29 in which the push rod 17 engages in the pivoted-in position of the lever 10, and therefore the lever stop 16 is formed by the base of the slot 29.

Furthermore, the impact protection device 9 has a housing 30 in which the lever 10 and the push rod 17 are installed. Here, the bearing 11 is coupled to the housing 30 and the tension spring 24 is fixedly connected to the housing 30. In addition, the housing 30 is designed to be of such a size that, when the lever 10 is in the pivoted-in position, the lever 10 and the push rod 17 are accommodated in the housing 30. The housing 30 has an opening through which the push rod 17 extends, and therefore the opening is configured as the push rod longitudinal guide 26.

In a manner corresponding to the external dimensions of the housing 30, an installation cavity 31 in which the housing 30 is installed is provided in the door leaf end face 5 of the door leaf 2. The installation cavity 31 is dimensioned in such a manner that the housing 30 is completely accommodated in the installation cavity 31.

If the swing door 1 is closed, the door leaf 2 is suitably arranged in the frame 7 such that a gap 8 remains between the frame 7 and the door leaf 2. The drive carriage 21 is arranged at a distance from the driver stop 23 and bears against the outer longitudinal end 20 of the push rod 17. The drive carriage 21 is pretensioned by the compression spring 22, and therefore the pretensioning is transmitted by the drive carriage 21 to the outer longitudinal end of the push rod 17. The tension spring 24 acts counter to the pretensioning of the push rod 17, but is weaker, and therefore a torque in the clockwise direction is transmitted by the push rod 17 via the joint 19 to the inner lever arm 12 of the lever 10 in FIG. 2. As a result, the lever 10 is driven into the pivoted-in position, and therefore the lever 10 is arranged together with the push rod 17 in the interior of the housing 30. Only the outer longitudinal end 20 of the push rod 17, which outer longitudinal end makes contact with the drive carriage 21, protrudes out of the housing 30 through the push rod longitudinal guide 26.

When the swing door 1 is opened, the door leaf 2 is moved in the opening direction 4 such that the impact protection device 9 is likewise moved in the opening direction 4 in the door leaf 2 relative to the frame 7. On account of the bias force of the compression spring 22, the drive carriage 21 follows the push rod 17 while contacting with the outer longitudinal end 20 of the push rod 17. This takes place until the drive carriage 21 strikes against the driver stop 23, and therefore, upon further opening of the swing door 1, the drive carriage 21 is no longer moving with the door leaf 2. Under the action of the pretensioning of the tension spring 24, the push rod 17 remains positioned with the outer longitudinal end 20 thereof on the drive carriage 21, with the lever 10 being pivoted with a torque counterclockwise about the bearing 11. The lever 10 is brought here from the pivoted-in position thereof into the pivoted-out position thereof, as shown in FIGS. 2 to 5. At the instant at which the lever 10 precisely reaches the pivoted-out position thereof, the outer longitudinal end 20 of the push rod 17 is still in contact with the drive carriage 21, wherein the outer lever arm 14 protrudes substantially perpendicularly from the door leaf end face 5. Upon further opening of the swing door, the outer longitudinal end 20 of the push rod 17 moves away from the drive carriage 21, with the lever 10 being held in a stable manner in the pivoted-out position by the tension spring 24. The outer lever arm 14 is arranged in front of the door leaf edge 6 as an extension of the door leaf 2, and therefore, if the door leaf 2 runs the risk of striking against a wall 32 instead of the door leaf edge 6, the longitudinal end 15 of the outer lever arm 14 strikes first against the wall 32. It is therefore prevented that the door leaf edge 6 strikes directly against the wall 32, and therefore possible damage to the door leaf edge 6 is avoided. Owing to the fact that the impact protection device 9 strikes with the pad 28 thereof against the wall 32, an excessive mechanical stressing of the wall 32 is prevented, and therefore possible damage to the wall 32 is avoided.

When the swing door 1 is closed, the door leaf 2 is pivoted again in a direction counter to the opening direction 4 toward the frame 7. As long as the lever 10 is clear of the frame 7, the outer longitudinal end 20 of the push rod 17 and the drive carriage 21 are arranged at a distance from each other. Upon further closing of the swing door 1, the outer longitudinal end 20 of the push rod 17 finally encounters the drive carriage 21, as a result of which, owing to the greater pretensioning effect of the compression spring 22 compared to the tension spring 24, a torque which acts in the clockwise direction is exerted on the lever 10 by the push rod 17. Upon further closing of the swing door 1, the lever 10 is brought from the pivoted-out position thereof into the pivoted-in position thereof, wherein the drive carriage 21 constantly bears against the driver stop 23.

The pivoted-in position of the lever 10 is reached, with the lever 10 still just being clear of the frame 7. The lever 10 is pressed with the lever stop 16 thereof against the push rod 17, as a result of which the lever 10 is in the pivoted-in position thereof. Owing to the fact that the lever stop 16 prevents a further pivoting of the lever 10, the drive carriage 21 is displaced counter to the opening direction 4 and the influence of the pretensioning by the tension spring 22 by the push rod 17. This continues until the swing door 1 is completely closed. In the closed state of the swing door, the impact protection device 9 is completely arranged between the gap 8, and therefore the impact protection device 9 is virtually invisible from outside the swing door 1.

Figure 9:
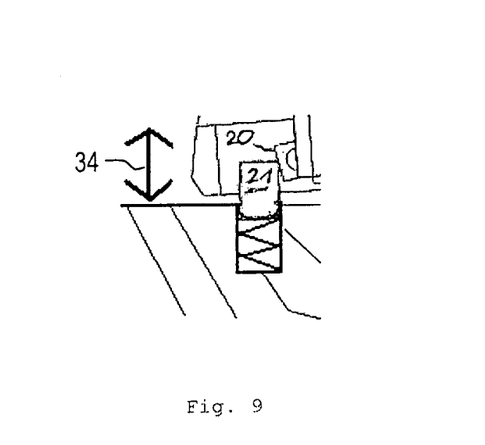
FIG. 9 shows a drive carriage designed as a pin according to an example embodiment.

FIG. 9 shows a drive carriage 21 designed as a spindle or pin which can be inserted into an opening in frame 5. As indicated by arrow 34 in FIG. 9, the pin can be moved up and down relative to frame 7.

Figure 10:
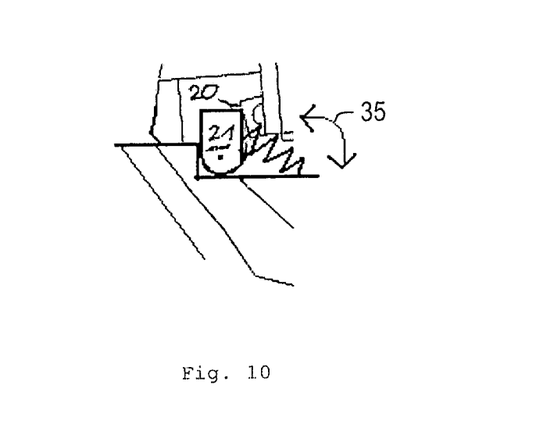
FIG. 10 shows a drive carriage designed as a pivot bolt according to another example embodiment.

FIG. 10 shows a drive carriage 21 designed as a pivot bolt. The pivot bolt can be pivoted on frame 7 as indicated by arrow 35.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Swing door
2 Door leaf
3 Door hinges
4 Opening direction

5 Door leaf end face
6 Door leaf edge
7 Frame
8 Gap
9 Impact protection device
10 Lever
11 Bearing
12 Inner lever arm
13 Longitudinal end of the inner lever arm
14 Outer lever arm
15 Longitudinal end of the outer lever arm
16 Lever stop
17 Push rod
18 Inner longitudinal end of the push rod
19 Joint
20 Outer longitudinal end of the push rod
21 Drive carriage
22 Second Biasing Arrangement/Compression Spring
23 Driver stop
24 First Biasing Arrangement/Tension Spring
25 Tension spring anchor
26 Push rod longitudinal guide
27 Pad plate
28 Cushion/Pad
29 Slot
30 Housing
31 Installation cavity
32 Wall
33 Moving direction of drive carriage
34 Moving direction of pin
35 Moving direction of pivot bolt

What is claimed is:

1. A swing door comprising:
a frame having a drive carriage and a driver stop;
said drive carriage being mounted slidably relative to said frame;
said driver stop being arranged on said frame to stop a movement of said drive carriage relative to said frame;
door hinges;
a door leaf having an end face and a door leaf edge; said door leaf being coupled to said frame via said door hinges; said end face facing away from said hinges;
a gap provided between said end face and said frame;
an impact protection device having a push rod, a lever, and a biasing arrangement supported on the door leaf;
said push rod having a first longitudinal end and a second longitudinal end;
said impact protection device being mounted on the end face of the door leaf;
said lever having an inner lever arm and an outer lever arm;
said lever being configured to pivot in an opening direction of the door leaf and in a direction opposite to the opening direction;
said lever being arranged in said gap as said door leaf is closed thereby defining a pivot-in position of the lever;
said outer lever arm protruding from said end face to protect the door leaf edge from an impact as said door leaf is opened and said drive carriage bearing against said driver stop thereby defining a pivot-out position of the lever;
said inner lever arm being coupled with the first longitudinal end of the push rod and said second longitudinal end of the push rod being coupled with said drive carriage of said frame to push the lever from the pivot-in position to the pivot-out position as said door leaf is opened;
said inner lever arm being coupled with the first longitudinal end of the push rod and said second longitudinal end of the push rod being coupled with the drive carriage of the frame to push the lever from the pivot-out position to the pivot-in position as said door leaf is closed; and,
said biasing arrangement engaging with said lever and holding said lever in said pivot-out position as said lever is decoupled from said drive carriage.

2. The swing door of claim 1, wherein the biasing arrangement is a coil spring or a torsion spring.

3. The swing door of claim 1, wherein said biasing arrangement is a first biasing arrangement,
wherein the impact protection device includes a second biasing arrangement that is supported on said frame and that engages with said drive carriage to pivot said lever, and
wherein a first bias force being generated by said second biasing arrangement and acting on the lever is larger than a second bias force being generated by said first biasing arrangement and acting on the lever such that as long as said push rod is coupled with said drive carriage and said drive carriage does not bear against said driver stop, the lever is pushed into said pivot-in position by said second biasing arrangement via the drive carriage and the push rod.

4. The swing door of claim 3, wherein the second biasing arrangement is a coil spring.

5. The swing door of claim 3, wherein the first biasing arrangement is configured to engage with the push rod and the second biasing arrangement is configured to engage with the push rod via the drive carriage.

6. The swing door of claim 3, wherein the drive carriage is a driver slide configured to be displaced on the frame in a longitudinal direction by overcoming the first bias force generated by the second biasing arrangement,
wherein the drive carriage is coupled with said second longitudinal end of the push rod until said drive carriage bears against said driver stop, and
wherein said second longitudinal end of the push rod is disengaged from the drive carriage as said door leaf is further opened after the drive carriage bears against said driver stop.

7. The swing door of claim 3, wherein the drive carriage is a compression block configured to be compressed on the frame by overcoming the first bias force generated by the second biasing arrangement,
wherein said compression block bears against said second longitudinal end of the push rod until said compression block reaches said driver stop, and
wherein said second longitudinal end of the push rod is arranged at a distance from said compression block as said door leaf is further opened after the compression block reaches said driver stop.

8. The swing door of claim 1, wherein the outer lever arm includes a cushion arranged to face away from said frame as said door leaf is open.

9. The swing door of claim 1, wherein the swing door is a door of a motor vehicle.

10. A swing door comprising:
a frame having a drive carriage;
said drive carriage being a pivot bolt that is pivotally mounted relative to said frame and that is configured to be pivoted on said frame by overcoming a first bias force generated by a second biasing arrangement;
door hinges;
a door leaf having an end face and a door leaf edge;

said door leaf being coupled to said frame via said door hinges;

said end face facing away from said hinges;

a gap provided between said end face and said frame;

an impact protection device having a push rod, a lever, and a biasing arrangement supported on the door leaf;

said push rod having a first longitudinal end and a second longitudinal end;

said impact protection device being mounted on the end face of the door leaf;

said lever having an inner lever arm and an outer lever arm;

said lever being configured to pivot in an opening direction of the door leaf and in a direction opposite to the opening direction;

said lever being arranged in said gap as said door leaf is closed thereby defining a pivot-in position of the lever;

said outer lever arm protruding from said end face to protect the door leaf edge from an impact as said door leaf is opened thereby defining a pivot-out position of the lever;

said inner lever arm being coupled with the first longitudinal end of the push rod and said second longitudinal end of the push rod being coupled with said pivot bolt to push the lever from the pivot-in position to the pivot-out position as said door leaf is opened;

said inner lever arm being coupled with the first longitudinal end of the push rod and said second longitudinal end of the push rod being coupled with said pivot bolt to push the lever from the pivot-out position to the pivot-in position as said door leaf is closed;

said biasing arrangement engaging with said lever and holding said lever in said pivot-out position as said lever is decoupled from said pivot bolt;

said pivot bolt bearing against said second longitudinal end of the push rod until said lever is decoupled from said pivot bolt; and, said second longitudinal end of the push rod being arranged at a distance from said pivot bolt as said door leaf is further opened.

\* \* \* \* \*